United States Patent
Lee

(10) Patent No.: US 6,347,701 B1
(45) Date of Patent: Feb. 19, 2002

(54) COMPACT DISK CASE

(76) Inventor: Ji In Lee, 128-46 Mook Dong, Jungrang-Ku, Seoul 131-140 (KR)

( * ) Notice: Subject to any disclaimer, the term of this patent is extended or adjusted under 35 U.S.C. 154(b) by 0 days.

(21) Appl. No.: 09/710,251

(22) Filed: Nov. 10, 2000

(30) Foreign Application Priority Data

Nov. 10, 1999 (KR) ............................................. 99-24524

(51) Int. Cl.⁷ ............................................. B65D 85/57
(52) U.S. Cl. ................................... 206/308.1; 206/309
(58) Field of Search ............................ 206/308.1, 300, 206/309–313, 445; 312/9.11, 9.16, 9.47, 9.53, 9.58

(56) References Cited

U.S. PATENT DOCUMENTS

| | | | | |
|---|---|---|---|---|
| 4,875,743 A | * | 10/1989 | Gelardi et al. ........... | 206/308.1 |
| 4,998,618 A | * | 3/1991 | Borgions ................. | 206/308.1 |
| 5,150,354 A | * | 9/1992 | Iwata et al. ............. | 206/308.1 |
| 5,617,950 A | * | 4/1997 | Chung .................... | 206/308.1 |
| 5,645,329 A | * | 7/1997 | Madock .................... | 312/9.11 |
| 5,690,221 A | * | 11/1997 | Yeh ........................ | 206/308.1 |
| 5,816,393 A | * | 10/1998 | Kim ........................ | 206/308.1 |

* cited by examiner

*Primary Examiner*—Luan K. Bui

(57) ABSTRACT

The present invention relates to a compact disk case which is suited to hold a plurality of compact disks in a housing having the shape of a book, which is conveniently opened and closed and which is secure against scratch, contamination and damage on the surface of the compact disks during the withdrawal of them. The compact disk case according to the present invention comprises: a book-like housing 10 with a compact disk receiving space 21, the space being open to one side; a top and bottom guide 30 and 40 each having a set of guiding grooves 30*a* and 40*a* for receiving a plurality of compact disks, the both sets of guiding grooves being arranged opposite to each other separately in the top and the bottom section of the receiving space 21 of the housing 10; and a plurality of pick-up means in the form of pick-up levers 50 for inserting and withdrawing compact disks. Said plurality of pick-up means being connected pivotally to the housing 10 or the bottom guide 40.

3 Claims, 3 Drawing Sheets

COMPACT DISK CASE

FIELD OF THE INVENTION

The present invention relates to a compact disk case, and more particularly to a compact disk case which is suited to hold a plurality of compact disks in a housing having the shape of a book, which is conveniently opened and dosed and which is secure against the surface scratch and the damage on compact disks during withdrawal of them.

BACKGROUND OF THE INVENTION

A compact disk is a medium for storing and recording data or programs and usually stored in a compact disk case.

In some instances, a set of compact disks contains contents belonging to a single same subject depending on the contents to be stored. If individual compact disk cases for the respective compact disks were used in those instances, inconvenience with respect to the store and use would be caused.

For instance, when a certain data or program is so large as to be received in ten pieces of compact disks, ten cases of compact disks would be required.

Therefore, those ten compact disk regarding a common data or program are apt to be mixed with other compact disks under different subjects of data in the stored state. In those cases, as a matter of course, confirmation by the titles shown on the side of compact disk cases would be possible, which is however somewhat tedious.

SUMMARY OF THE INVENTION

The object of the present invention which was created in consideration of the above described circumstance is to provide a compact disk case which has the shape of a book to be suitable to hold a plurality of compact disks, which is conveniently opened and dosed and which is secure against the surface scratch and the damage on compact disks during the withdrawal of them.

The object is to achieved according to the present invention by a compact disk case which comprises a book-like housing with a compact disk receiving space, the space being open to one side; a top and bottom guide each having a set of guiding grooves for receiving a plurality of compact disks, the both sets of guiding grooves being arranged separately in aligned opposite positions in the top and bottom section of the compact disk receiving space of the housing; and a plurality of pick-up means in the form of pick-up levers for inserting and withdrawing compact disks by picking them up with predetermined force in a position opposite to the guiding grooves for compact disks, said plurality of pick-up means being connected pivotally to the housing or the bottom compact disk guide.

DETAILED DESCRIPTION OF THE INVENTION

The inventionwibe below described along a preferred embodiment in conjunction with the attached drawings.

Figure 1:
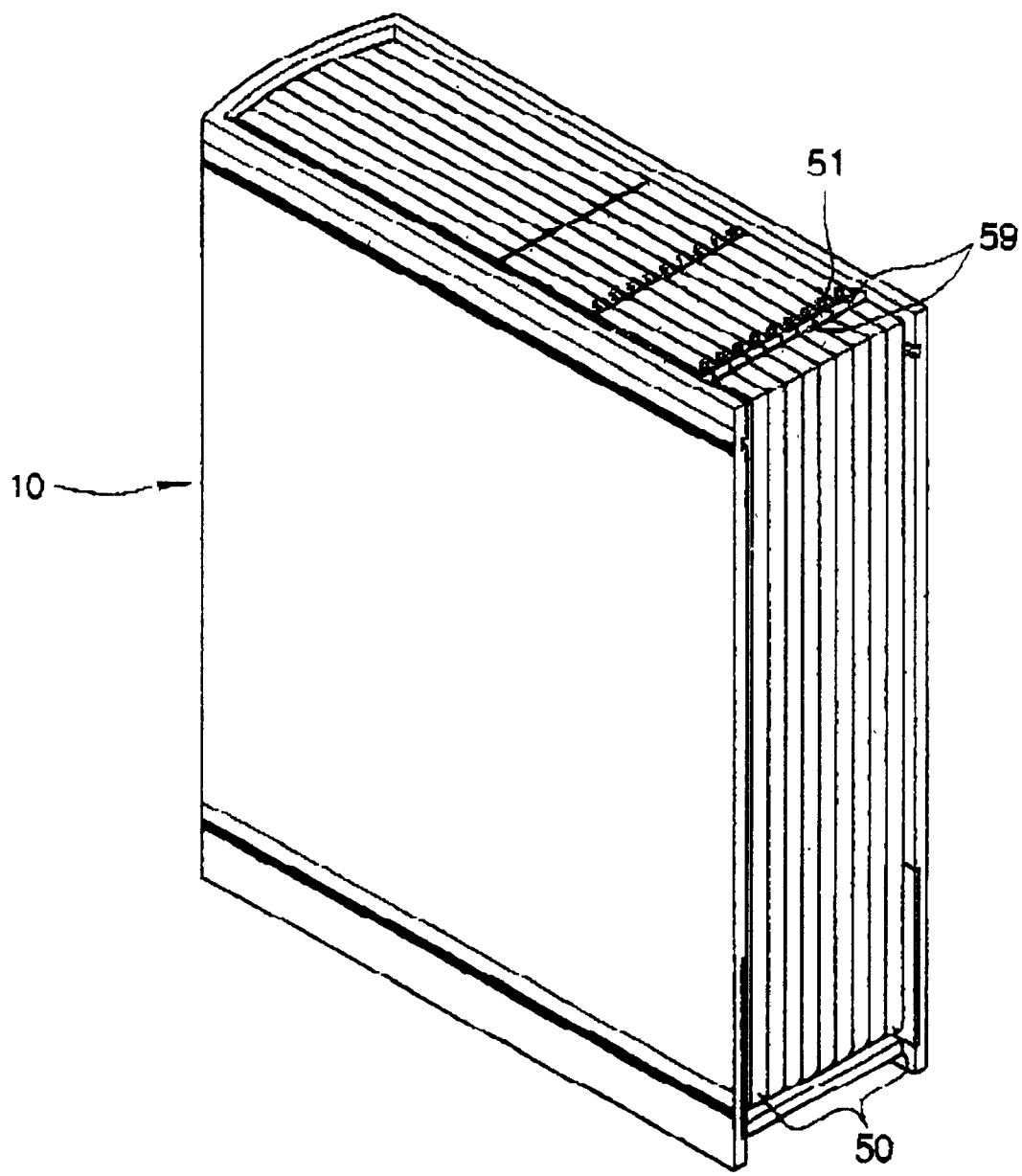
FIG. 1 shows the perspective view of the compact disk case according to a preferred embodiment of the invention.

FIG. 1 shows the perspective view of a compact disk case according to a preferred embodiment of the present invention, wherein the compact disk case assumes the appearance of a medium-size book. Preferably it is made compact at the size of a dictionary.

The housing 10 has an integral construction except for the rear side, both wide lateral sides, narrow top and bottom sides as well as the front side. On the rear side, these is disposed a pick-up lever 50 which will be later described in more detail with reference to FIG. 2.

Figure 3:
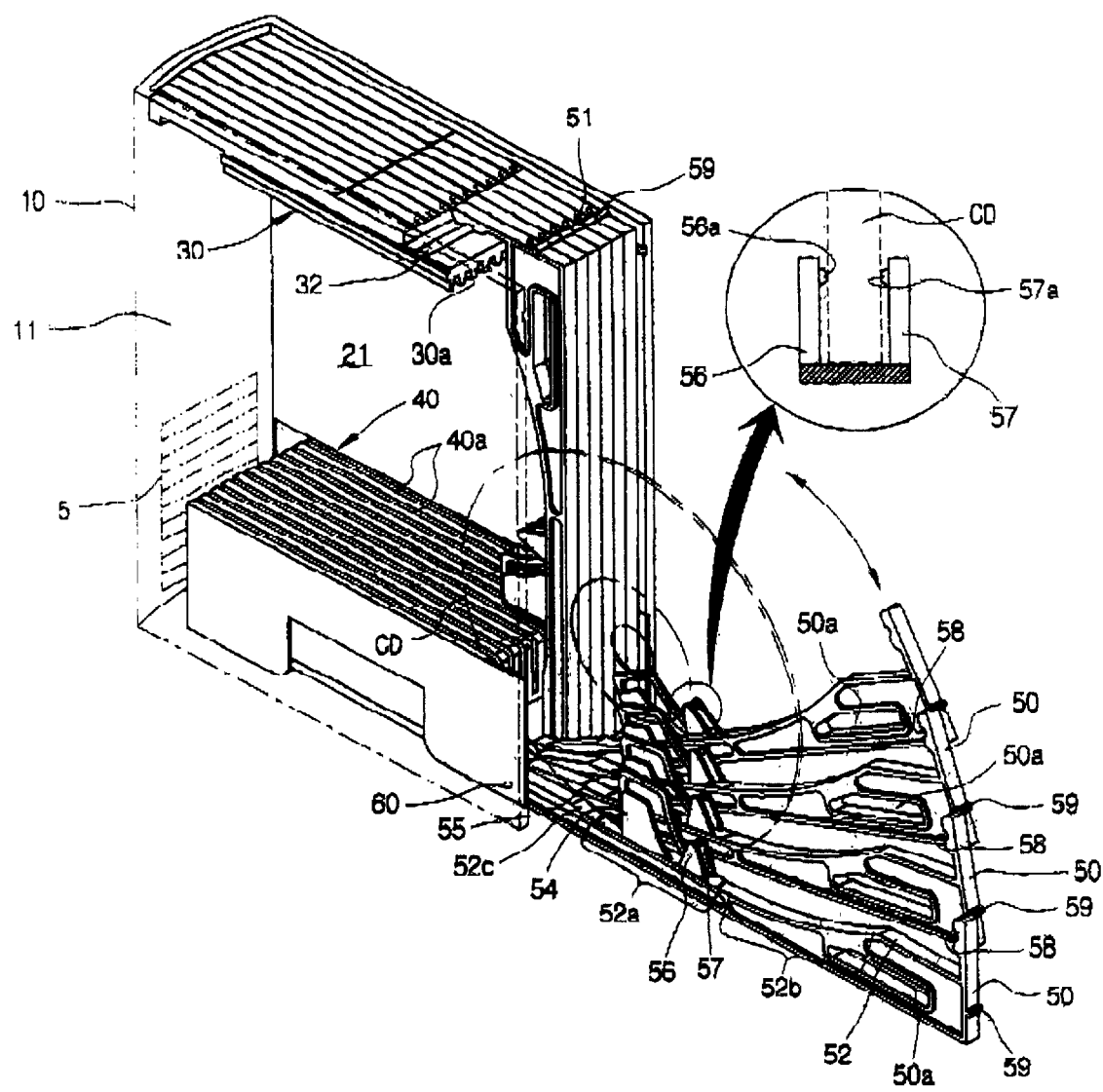
FIG. 3 shows the view of the compact disk case according to a preferred embodiment of the invention as put to use ans the enlarged view of an essential part.

Accordingly, on the front face 11 of the housing 10, an identification label 5 on which the text for the respective compact disks is written may be attached to indicate the index according to classification, as shown in FIG. 3, so that a user may find the desired compact disk easily.

Inside the housing 10, a compact disk receiving space 21 is provided to store plural, for example 10 compact disks as shown in FIG. 3. In the top and bottom sections of the compact disk receiving space 21, a top guide 30 and a bottom disk guide 40 each having ten guide grooves 30a or 40a for the insertion of compact disks are arranged.

Every pair of guide grooves 30a and 40a are disposed to oppose each other, in the manner of an upper one against the corresponding lower one, and the distances between the adjacent pairs of the grooves are chosen equal to keep the compact disks at the same intervals.

The bottom guide 40 is provided on its one side with a number of, for example 10 pick-up levers 50 as shown in the drawings, as a pick-up means in a parallel manner to put in or pick out from the compact disks stored in the guide grooves 30a and 40a, which grooves are formed in the top and bottom guides 30 and 40.

Figure 2:
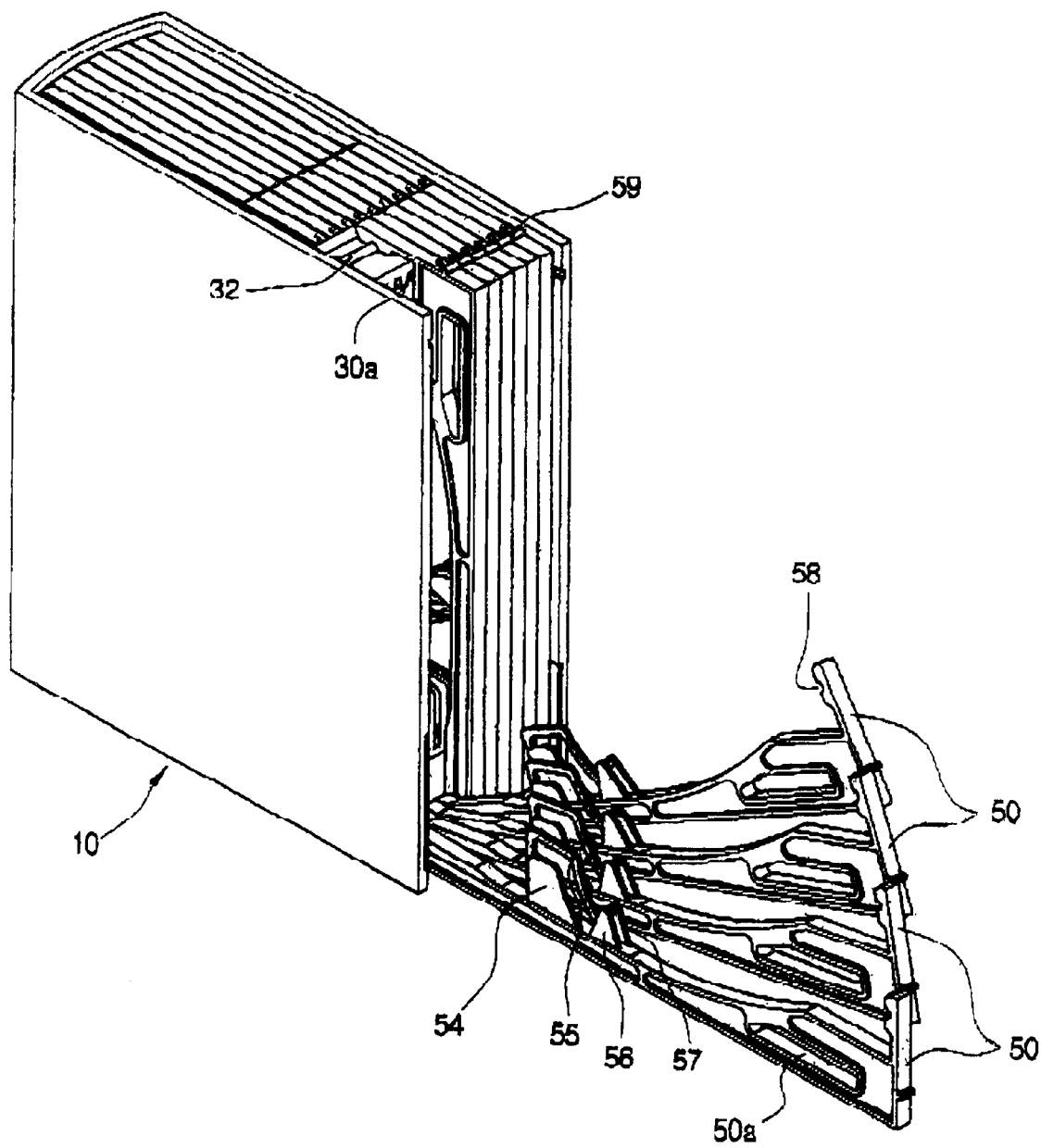
FIG. 2 shows the perspective view of the compact disk case, with some pick-up levers as applied to a preferred embodiment of the invention opened.

Particularly, on one side of the guide 40, these is fixed a rotation axle 60 with which 10 pick-up levers 50 at dose spacings are combined rotatably, as seen in FIGS. 2 and 3.

Referring to the structure of one of those pick-up levers 50, a pick-up lever 50 is provided on its inner face with a supporting surface 52 to support a compact disk, which supporting surface consists of a linear section 52a and arc sections 52b and 52c each having the same curvature as a compact disk.

The linear section 52a of the compact disk supporting surface 52 is provided with two risers 54 and 55 formed upright at a spacing corresponding to the thickness of a compact disk to support the compact disk against its lower parts on the opposite sides so that the compact disk can stand vertically relative to the pick-up lever 50 in the state as shown in FIG. 3. Pick-up pieces 56 and 57 are vertically provided facing each other on the supporting surface 52 in the vicinity of the risers 54 and 55 to press on the outer surfaces of a compact disk with a predetermined force. Further, the pick-up pieces 56 and 57 are provided on the inside surfaces with projections 56a and 57a for point contact with the compact disk, as can be understood from the enlarged view of FIG. 3.

The projections 56a and 57a may desirably be either made of urethane or rubber based material or coated with a separate friction material to improve the contacting force with a compact disk or decrease the slip.

The pick-up lever 50 is formed on its upper end with a grove 58 to elastically engage with an engagement ridge 32 formed on the roof of the top guide 30.

The pick-up lever 50 is formed on its top surface with a linear pulling projection 59, so that the pick-up lever 50 is its dosed state within the housing 10 may be easily opened through pivotal motion by gripping the projection with a finger.

Beside the above-described projection for the finger actuation, a pin hole 51 may be formed adjacent to the pulling projection 59 on the pick-up lever 50 to allow the use of certain tool such as a ballpoint pen for example for opening the pick-up lever, as seen in FIG. 1.

Instead of forming a continuous straight line with pulling projections in their collected state within a case as in the instance represented in FIG. 1, the pulling projections 59 may be preferably formed in a discrete manner, i.e., neighboring projections may form only an interrupted line in the closed state of compact disks so that actuation of a certain selected pulling projection with a finger may not interfere with other pulling projections.

The symbol 50 stands for an opening for a finger to enable a user to close a pick-up lever 50 in the opened state by using that opening.

On the other hand, the top guide 30 and bottom guide 40 can be formed as one piece instead of separately assembled form as in the illustrated embodiment Similarly, the pick-up lever may be pivotally installed on the side of the hull of a housing 10, differently from the illustrated embodiment wherein the lever is pivotally installed on a side of the bottom guide 40.

Now, the operation of a compact disk case constructed as disclosed above is described.

First, the housing 10 in the state wherein all the pick-up levers 50 are closed as seen in FIG. 1 has the shape of a book.

Then, one selected from the pick-up levers 50 is pulled by pulling its pulling projection 59. Then the selected pick-up lever 50 is opened by rotating around the rotation axle 60 clockwise or downward as seen in FIG. 3.

When a compact disk is put, in that state, between the risers 54 and 55, the compact disk is erected on the supporting surface 52 provided on the pick-up lever 50 by virtue of the risers 54 and 55 and at the same time the compact disk is nipped between the projections 56a and 57a formed on the inner faces of the pick-up pieces 56 and 57 under an constant force.

Now, when the pick-up lever 50 is caused to rotate upward to the closed, first the compact disk is guidedly inserted with its front side into the corresponding guide groove 40a of the bottom guide 40. When the rotating angle has exceeded about 45 degrees, the compact disk is inserted also with its upper part into the guide groove 30a of the top guide 30.

When the pick-up lever 50 is closed in this way, the compact disk can be contained completely within the housing 10 with its lower part inserted in the bottom guide groove 30a of the top guide 30 and its top part fitted in the top guide groove 40a of the bottom guide 40, wherein the pick-up pieces 56 and 57 of the pick-up lever 50 holds the compact disk with a constant force through its projections 56a and 57b and the groove 58 formed on the under face of the pick-up lever 50 is elastically engaged with the engagement ridge 32 formed on the top of the top of guide 30.

In this manner a plural number of compact disks can be stored in a compact disk case. Obviously, the number of compact disks to be stored in a compact disk case is not limited to 10 as illustrated in the embodiment, but can be increased or decreased as required.

Thus the compact disks under the same classification can be stored in a same compact disk case and conveniently used. Preferably the index numbers and corresponding contents for the compact disks contained in the casing are indicated on the front surface of the casing.

As is evident, the pick-up lever 50 corresponding to the index number shown on, e.g., a label may be pulled forward, when a specific compact disk is intended to use.

In particular, the pick-up lever 50 is rotated pivotally downward by means of the pulling projection 59 or the pin hole 51 to disengage the groove 58 on the pick-up lever 50 out of the engagement ridge 32 on the top guide 30.

With the opening motion of the pick-up lever 50, the pick-up pieces 56 and 57 pull the compact disk from the upper and lower guide grooves 30a and 40a to result in the state shown in FIG. 3, wherein the compact disk pulled out stands between the risers 56 and 57, the projections 56a and 57a on which holds the compact disk tight When the user pulls out the compact disk standing on the side of the pick-up lever 50, the disk is separated from between the projections 56a and 57a of the pick-up pieces 56 and 57.

On the other hand, projection lines (not shown) may be provided at finite intervals at an angle to the ridges to prevent the pick-up levers 50 meshed in the engagement ridges 32 from playing laterally, so that a tighter engagement of the pick-up levers with the guide may be insured.

The compact disk cases which are in the form of a book according to the present invention can be arranged orderly and neatly like books in a book stand. Not only a number of compact disks can be simply stored in an compact disk case, but also compact disks relating to a variety of classes including, for example, a music, general data, and a game can be put together in various corresponding compact disk cases according to their kinds, whereby the control and usability are enhanced.

As suggested earlier, a scratch, contamination ans damage on the surface of the compact disk can be satisfactorily avoided, because opening and closing a compact disk from and into the compact disk case is possible in one touch manner through a simple press of the pick-up lever at a point.

It is to be understood that, while the invention was described with respect to a specific embodiment, the invention is never restricted to that embodiment and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A compact disc case comprising a housing (10) shaped in the form of a book with a disc receiving space (21) the space being open to the front and top sides, a top and bottom guide (30, 40) each having a set of guiding grooves (30a, 40a) for receiving a plurality of compact discs, the sets of guiding grooves being arranged opposite to each other separately in the top and bottom section of the receiving space (21) of the housing (10), a plurality of pick-up means in the form of pick-up levers (50) for inserting and withdrawing each compact disc by picking each up with a predetermined force with relation to the guiding grooves (30a, 40a) for compact discs, said plurality of pick-up means being connected pivotably to the housing (10) to the bottom guide (40), the pick-up levers (50) are provided on their inside with a section (52b) and a linear section (52a) on which section risers (54) and (55) as well as pick-up pieces (56), (57) are erected so as to oppose each other to hold each compact disc therebetween, in which the pick-up pieces (56, 57) each are formed on their inside surfaces with a projection (56a, 57a) and the pick-up lever levers (50) are each formed in the inside surfaces of their top areas with a groove (58) to elestically engage with engagement ridges (32) formed on the top surface of the top guide (30).

2. The compact disc case according to claim 1, wherein the pick-up lever (50) is formed on its top surface with a projection (59) along the whole width or a part of the width of the pick-up lever (10) or with a pin hole (51) located near the projection, as a means to open the pick-up lever (50) from the housing (10).

3. The compact disc case according to claim 1 wherein the projections (56*a*) and (57*a*) are composed of the rubber or urethane-based material to increase the contacting force of the projections with the compact discs.

* * * * *